May 5, 1925.
L. G. MEUSER
CONVERTIBLE AUTO BODY
Filed Feb. 1, 1923
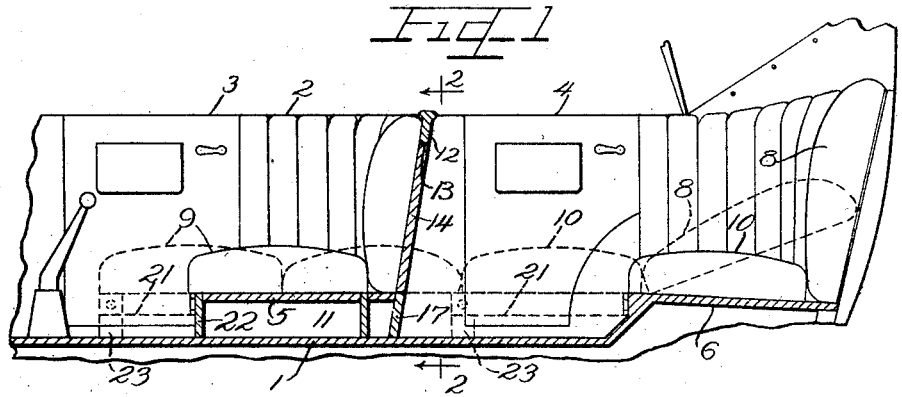

Patented May 5, 1925.

1,536,807

UNITED STATES PATENT OFFICE.

LLOYD G. MEUSER, OF CHICAGO, ILLINOIS.

CONVERTIBLE AUTO BODY.

Application filed February 1, 1923. Serial No. 616,328.

*To all whom it may concern:*

Be it known that I, LLOYD G. MEUSER, a citizen of the United States, and a resident of the city of Chicago, in the county of Cook and State of Illinois, have invented certain new and useful Improvements in a Convertible Auto Body; and I do hereby declare that the following is a full, clear, and exact description of the same, reference being had to the accompanying drawings, and to the numerals of reference marked thereon, which form a part of this specification.

This invention relates to a convertible automobile body wherein the seat cushions are removable to form a sleeping compartment or bed within the body, utilizing the various seat and back cushions as a mattress therefor.

Long automobile bodies, such as phaetons and sedans require a permanent lateral tie or brace such as is usually formed by a continuous back for the front seat. It has been found that in bodies without such a tie, as when a passage is left between individual front seats, the body tends to weave so that all the joints therein work loose after a time, resulting in excessive rattles and poorly fitting doors. Heretofore convertible bodies have been proposed wherein the back of the front seat is entirely removable to enable the use of some form of folding cot or the like within the body. Removal of the seat back renders the body insecure, as mentioned heretofore, as a removable seat back cannot practically be joined so firmly to the rest of the body as to materially stiffen the whole assembly, while the removable feature adds two more joints to give and allow the body as a whole to work or weave in unison with the chassis frame. This invention is intended to avoid such an unbraced body while at the same time providing a removable panel in the back of the front seat that will permit the formation of a full length bed within the body and close to the floor thereof while maintaining a solid arch connecting the sides of the body at the front seat location.

It is an important object of this invention to provide removable seat and back cushions in an automobile adapted to be aligned on supports near the floor thereof to form a spring mattress.

It is another important object of this invention to provide a substantial built-in arch across the top of the back of the front seat and to provide a removable panel therebelow to permit the extension of a bed into the front compartment of a car.

It is a further important object of this invention to provide foldable supports for cushions in an automobile body, adapted to align the top surfaces of the cushions to form a mattress.

It is an important object of this invention to provide a convertible automobile body having the usual appearance and all the comfort of an ordinary touring or sedan body without obtrusive evidence of the convertible features embodied therein.

It is another important object of this invention to produce a convertible automobile body of pleasing appearance and real comfort in both phases of its usefulness, and at a cost of manufacture closely comparable with similar automobile bodies without the convertible features.

Other and further important objects of the invention will be apparent from the disclosures in the drawings and specification.

The invention (in a preferred form) is illustrated in the drawings and hereinafter more fully described.

On the drawings:

Figure 1 represents a longitudinal section of a five passenger phaeton automobile body embodying a preferred form of the device of this invention with the convertible feature shown in dotted lines.

Figure 2 is a section on the line 2—2 of Figure 1.

Figure 3 is a fragmentary top plan view of the front compartment of such a body as shown in Figure 1.

Figure 4 is an end detail of the retaining means for the removable panel in the back of the front seat.

As shown on the drawings:

The reference numeral 1 refers to the floor of an automobile body 2 having the usual doors 3 and 4 and front and rear cross seat frames 5 and 6. In an ordinary body, both the front and rear seats and the sides of the body up to the door frames would be upholstered. This invention contemplates permanently upholstering only the sides of the body from the door frames to the seat backs proper, removable front and rear seat back cushions 7 and 8 being provided as shown. The seat cushions proper 9 and 10 are removable in the usual manner, a storage compartment 11 being shown under the front seat frame 5.

An arch 12 is built in as part of the body in the usual position of the front seat back, the arch providing a large-sized opening 13 for purposes to be brought out hereinafter. The arch serves to materially stiffen the body panels between the doors, and to thereby greatly lessen or prevent the body weaving found in long bodies without such a tie. A removable panel 14 is fitted in this arch and when in place gives the appearance of a practically solid back differing very little from the front seat backs commonly in use. This panel is secured in place by dowel pins 15 fitting in suitable sockets 16 in a lower section 17 of the seat back and spring-pressed draw bolts 18 engage in similar sockets 19 in the arch 12. Pivoted handles 20 are attached to the draw bolts and are intended to be folded out of the way when not in use. The handles may be brought out on either side of the panel as desired, for instance, if it is desired to conceal the unusual features of the convertible body, the handles may be brought out on the forward side of the panel behind the removable cushion. By referring to Figure 2 it will be seen that at its ends the arch 12 is connected to the body 2 from points extending from the lower section 17 of the seat back to the upper edge of the body 2, thus providing a cross brace for said body 2 equally as efficient as a solid front seat back.

Foldable supports comprising arms 21 are hinged to the heel boards 22 or fronts of the seat frames and carry pivoted legs 23 at their extremities. When swung out as shown by the dotted lines in Figures 1 and 3, they serve to support the seat cushions in a level position to form a spring mattress. Center supports are also shown, comprising an arm 24 adapted to fold over onto the top of the seat frame with a hinged leg 25 attached to the extremity of the arm. The center support would be unnecessary if the frames upon which the seat cushions are built up are sufficiently strong to prevent sagging between the end supports. It is to be understood that these supports are alike in the front and rear compartments aside from any difference in the length of arms due to the position of the cushions to be supported.

In converting this body into a sleeping compartment, the arms 21 and 24 are swung into position, the panel 14 removed from the back of the front seat and the cushions laid out on the seat frames and supports to form a bed. It will be noted that the dotted lines in Figure 1 show that the front seat back cushion extends through the aperture 13 formed by the removable panel 14 and the occupants of the bed so formed are enabled to extend their feet through the opening.

As shown, the rear seat back cushion is not brought down level with the balance of the cushions, the idea being to form a pillow by permitting the elevation of the cushion as shown, but of course, it will be evident that by sliding the rest of the cushions forward, the rear cushion can be brought down level.

It will thus be evident that this invention provides a full length bed close to the bottom of the body, assuring privacy due to the high sides of the body, whereas with a frame stretched above the seat backs, the sleepers are exposed through the various curtain lights of an open car. Moreover, this construction obviates weakening the body by cutting away the tie across the back of the front seat, and requires very little change in the body, in fact an ordinary body may be rebuilt into this form at a relatively small cost by cutting out a panel and making the seat back cushions removable.

I am aware that numerous details of construction may be varied through a wide range without departing from the principles of this invention, and I therefore do not purpose limiting this patent granted, otherwise than necessitated by the prior art.

I claim as my invention:

1. In an automobile body, a front seat back comprising an arch-shaped upper portion built into the body to form a permanent tie and brace and extending at its ends from the seat to the top of the body, and a removable panel fitted below said arch and extending between the same and the front seat frame.

2. In an automobile body, a front seat back comprising an arched-shaped upper portion built into the body to form a permanent tie and brace and extending at its ends from the seat to the top of the body, a removable panel below said arch forming the balance of the seat back and extending between the same and the front seat frame, and sliding bolts in said panel adapted to engage in sockets in the built-in arch to retain the panel in place.

In testimony whereof I have hereunto subscribed my name in the presence of two subscribing witnesses.

LLOYD G. MEUSER.

Witnesses:
CARLTON HILL,
OSCAR HARTMANN.